(12) United States Patent
Smith et al.

(10) Patent No.: US 12,023,905 B2
(45) Date of Patent: Jul. 2, 2024

(54) TEAR AND HEAT RESISTANT FOAM FOR PACKAGING, PROTECTIVE PACKAGING BAGS AND RELATED METHODS

(71) Applicant: Automated Solutions, LLC, Sawmills, NC (US)

(72) Inventors: Anthony R. Smith, Lenoir, NC (US); Sara C. Robinson, Hickory, NC (US)

(73) Assignee: Automated Solutions, LLC, Sawmills, NC (US)

( * ) Notice: Subject to any disclaimer, the term of this patent is extended or adjusted under 35 U.S.C. 154(b) by 0 days.

(21) Appl. No.: 17/713,967

(22) Filed: Apr. 5, 2022

(65) Prior Publication Data

US 2022/0410551 A1    Dec. 29, 2022

Related U.S. Application Data

(60) Provisional application No. 63/170,848, filed on Apr. 5, 2021.

(51) Int. Cl.
| | | |
|---|---|---|
| B32B 7/027 | (2019.01) | |
| B32B 5/02 | (2006.01) | |
| B32B 5/24 | (2006.01) | |
| B32B 7/12 | (2006.01) | |
| B32B 27/32 | (2006.01) | |
| B32B 37/00 | (2006.01) | |

(Continued)

(52) U.S. Cl.
CPC .............. *B32B 7/027* (2019.01); *B32B 5/022* (2013.01); *B32B 5/245* (2013.01); *B32B 7/12* (2013.01); *B32B 27/32* (2013.01); *B32B 37/0053* (2013.01); *B32B 37/06* (2013.01); *B32B 2037/1215* (2013.01); *B32B 2250/02* (2013.01); *B32B 2250/242* (2013.01); *B32B 2255/102* (2013.01); *B32B 2255/26* (2013.01); *B32B 2305/20* (2013.01); *B32B 2307/306* (2013.01); *B32B 2307/5825* (2013.01); *B32B 2307/718* (2013.01); *B32B 2307/732* (2013.01); *B32B 2323/04* (2013.01); *B32B 2323/10* (2013.01); *B32B 2553/00* (2013.01)

(58) Field of Classification Search
None
See application file for complete search history.

(56) References Cited

U.S. PATENT DOCUMENTS

| | | |
|---|---|---|
| 1,770,865 A | 7/1930 | Royal |
| 1,814,967 A | 7/1931 | Royal |

(Continued)

*Primary Examiner* — Chinessa T. Golden
(74) *Attorney, Agent, or Firm* — Michael Best & Friedrich LLP

(57) ABSTRACT

Tear and heat resistant foams used in packaging, protective packaging bags and related methods are provided. The tear and heat resistant foam can include a nonwoven substrate, a polyethylene film, and a base layer of polyethylene foam joined together by applying at least one of heat or heat and pressure to the top nonwoven substrate, the polyethylene film and the polyethylene foam to heat the first surface of the top nonwoven substrate to a temperature that is above the melting point of polyethylene film but below the melting point of top nonwoven substrate. The temperature of the polyethylene film rises causing the polyethylene film to melt and bind the top nonwoven substrate to the polyethylene foam to form the heat and tear resistant packaging foam.

17 Claims, 6 Drawing Sheets

(51) Int. Cl.
 *B32B 37/06* (2006.01)
 *B32B 37/12* (2006.01)

(56) References Cited

U.S. PATENT DOCUMENTS

| | | |
|---|---|---|
| 1,989,794 A | 2/1935 | Duvall |
| 2,121,259 A | 6/1938 | Scott |
| 2,265,075 A | 12/1941 | Knuetter |
| 2,474,770 A | 6/1949 | Yount et al. |
| 2,805,973 A | 9/1957 | Klasing et al. |
| 2,897,109 A | 7/1959 | Voigtman |
| 3,044,429 A | 7/1962 | Levi |
| 3,044,517 A | 7/1962 | Levi |
| 3,111,154 A | 11/1963 | Levi |
| 3,248,040 A | 4/1966 | Friedman |
| 3,506,049 A | 4/1970 | Gerard |
| 3,669,252 A | 6/1972 | Evans |
| 3,734,394 A | 5/1973 | Dooley |
| 3,744,360 A | 7/1973 | Currie et al. |
| 3,750,872 A | 8/1973 | Bobb |
| 3,827,341 A | 8/1974 | Stage |
| 3,891,138 A | 6/1975 | Glas |
| 3,938,661 A | 2/1976 | Carmody |
| 3,948,436 A | 4/1976 | Bambara |
| 3,986,611 A | 10/1976 | Dreher |
| 4,011,798 A | 3/1977 | Bambara et al. |
| 4,507,163 A | 3/1985 | Menard |
| 4,878,765 A | 11/1989 | Watkins et al. |
| 4,878,974 A | 11/1989 | Kagawa |
| 4,937,131 A | 6/1990 | Baldacci et al. |
| 4,987,997 A | 1/1991 | Raszewski et al. |
| 5,057,169 A | 10/1991 | Adelman |
| 5,143,133 A | 9/1992 | Speckman |
| 5,188,581 A | 2/1993 | Baldacci |
| 5,407,078 A | 4/1995 | Strauser |
| 5,465,842 A | 11/1995 | Utley |
| 5,474,185 A | 12/1995 | Franke |
| 5,701,999 A | 12/1997 | Phillips, II et al. |
| 5,881,883 A | 3/1999 | Siegelman |
| 5,882,776 A | 3/1999 | Bambara et al. |
| 6,006,905 A | 12/1999 | Campbell, Jr. |
| 6,189,962 B1 | 2/2001 | Campbell, Jr. |
| 2017/0341836 A1* | 11/2017 | Parkinson ............ B65D 75/008 |

* cited by examiner

TEAR AND HEAT RESISTANT FOAM FOR PACKAGING, PROTECTIVE PACKAGING BAGS AND RELATED METHODS

RELATED APPLICATIONS

This application claims priority to U.S. Provisional Patent Application Ser. No. 63/170,848, filed Apr. 5, 2021, the entire contents of which is hereby incorporated by reference herein.

TECHNICAL FIELD

The subject matter disclosed herein relates to tear and heat resistant foams used in packaging, protective packaging bags and related methods of making and using the same. In particular, the present subject matter relates to polyethylene foam that is treated to be tear and heat resistant and packaging materials and protective packaging bags comprising the tear and heat resistant polyethylene foam as well as methods related to the packaging foam, materials, and protective bags.

BACKGROUND

The need for shipping packaged goods has increased over the last few decades with the advent of online purchasing, through such e-commerce website as Amazon or online box stores, such as Walmart online. This increased need has been exacerbated by the recent COVID-19 pandemic during which people have increasing relied on home delivery of both large and small goods. Often times, these goods being shipped to customers need to be packaged in a material that will protect the item or product being shipped. Polyethylene foam has proven to be a cost-effective material for businesses to use to provide such protective packaging for thousands of items and products of various sizes. Such items can include, but are not limited to: jewelry; utility items, such as knives of various sizes, tools, etc.; electronics, such as cellular phones, tablet devices, televisions, computers, flash drives or other fobs, etc.; personal care items, such as make-up items, moisturizers and creams, razors, brushes, combs, hair dryers, etc.; home furnishings, including case good furniture, upholstered furniture, pillows, sheets, fabric coverings, decorative accessories, artwork, etc.; toys of various sizes; and books of various sizes.

Often, heat is used in the packaging of these items to either seal the packaging or shrink wrap the packaging to conform to the shape of the product to aid in the protection of the product from damage and the package from tearing during shipping. The heat sources used to seal the packaging or shrink wrap the packaging can generate temperatures at the surface of the polyethylene foam packaging that can rise above the melting point of polyethylene and cause the polyethylene foam to melt. When the polyethylene foam packaging material begins to melt, it deteriorates quickly. The benefits of having the item or items wrapped in foam are then lost with little or no protection provided by the remnants of the foam. Additionally, the polyethylene foam can be easily torn during handling of the packaging before and during package formation due to its low resistance against shear forces.

As such, a need exists, for example, for polyethylene foam packaging material that can more effectively form packaging around a wider range of sizes of items to be shipped, while also providing sturdier packages that will not easily tear or melt during package formation.

SUMMARY

It is an object of the present disclosure to provide novel tear and heat resistant foam used in packaging, protective packaging bags and related methods of making and using the same. In particular, the present subject matter relates to polyethylene foam that is treated to be tear and heat resistant and packaging materials and protective packaging bags comprising the tear and heat resistant polyethylene foam as well as methods related to the packaging foam, materials, and protective bags.

While a few objects of the presently disclosed subject matter have been stated hereinabove, which can be achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter to one of ordinary skill in the art is set forth more particularly in the remainder of the specification and in the other documents, pictures and figures attached herewith, including reference to the accompanying figures in which.

Figure 1A:
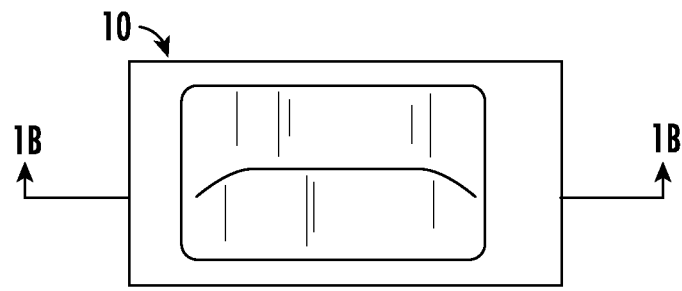
FIG. 1A illustrates a perspective view of an embodiment of a package of a product to be shipped that incorporates an embodiment of a tear and heat resistant foam according to the subject matter disclosed herein.

Repeat use of reference characters in the present specification and drawings is intended to represent the same or analogous features or elements of the invention.

DETAILED DESCRIPTION

Reference will now be made in detail to the description of the present subject matter, one or more examples of which are shown in the pictures and figures. Each example is provided to explain the subject matter and not as a limitation. In fact, features illustrated or described as part of one embodiment may be used in another embodiment to yield still a further embodiment. It is intended that the present subject matter cover such modifications and variations.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, in the present disclosure, when a feature, element, component, region, layer and/or section is being described as "top", "bottom," "front," "rear," "side," etc., it should be understood that such terms are relative and not absolute. Thus, something that is described with the adjective of "top" may also be considered on a side or a bottom depending on the orientation of the larger subject being described. Additionally, when a feature, element, component, region, layer and/or section is being described as "under," "on," or "over" another feature, element, component, region, layer and/or section, it is to be understood that the features, elements, components, regions, layers and/or sections can either be directly contacting each other or have another feature, element, component, region, layer and/or section between the them, unless expressly stated to the contrary. Similarly, directional movement, such as "back and forth," "forward," "backward," "up," "down," or the like are to be understood as relative descriptions that can change depending on the orientation of the subject matter relative to the viewer. Thus, these terms are simply describing the relative position of the features, elements, components, regions, layers and/or sections to each other and do not necessarily mean an absolute position or direction since the relative position above or below depends upon the orientation of the subject matter to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of a packaging sheet, packaging material and/or methods of making or using the same and are not intended to limit the scope of the subject matter disclosed herein.

As disclosed herein, a tear and heat resistant packaging foam is provided that can comprise a base layer of polyethylene foam with a first surface and a second surface. The tear and heat resistant packaging foam can also comprise a film having a first surface and a second surface with the film being positioned on the polyethylene foam such that the second surface of the film resides on the first surface of the polyethylene foam. Further, the tear and heat resistant packaging foam can comprise a nonwoven substrate having a first surface and a second surface with the nonwoven substrate being positioned on the film such that the second surface of the nonwoven substrate resides on the first surface of the film. The nonwoven substrate can comprise a material having a melting point above the melting point of the film. The nonwoven substrate, the film, and the base layer of polyethylene foam can be joined together by applying at least one of heat or heat and pressure to the top nonwoven substrate, the film and the polyethylene foam to heat the first surface of the top nonwoven substrate to a temperature that is above the melting point of film but below the melting point of top nonwoven substrate such that the temperature of the film rises causing the film to melt and bind the top nonwoven substrate to the polyethylene foam to form the heat and tear resistant packaging foam.

In some embodiments, the nonwoven substrate can comprise a thermoplastic spunbond material. In some embodiments, the nonwoven substrate can comprise a polypropylene spunbond material. In some embodiments, the film can comprise a polyethylene film. In some embodiments, the film can comprise a low-density polyethylene film. In some embodiments, the film can comprise a high-density polyethylene film.

Figure 1B:
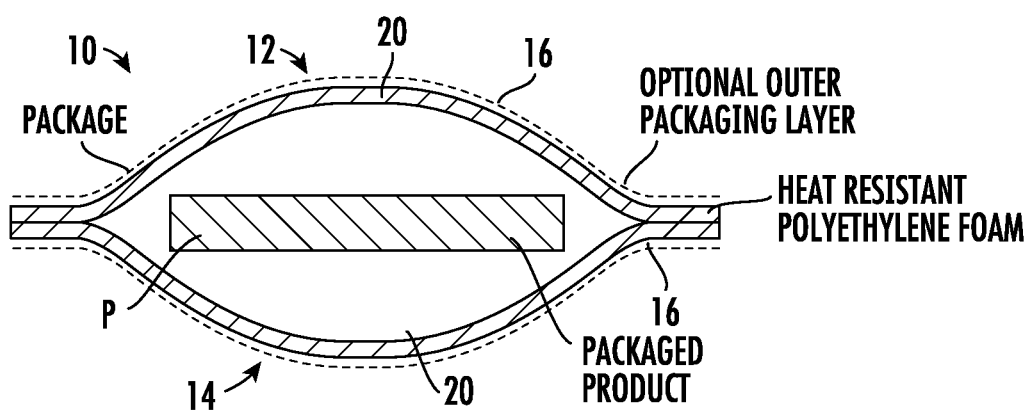
FIG. 1B illustrates a schematic cross-sectional side view of the embodiment of the package according to FIG. 1A taken along the lines AA.

Referring to FIGS. 1A and 1B, an embodiment of a package, generally designated 10, is provided that is used to protect a product P during storage of the product and during shipping to its final destination. The package 10 can comprise a top substrate packaging layer 12 and a bottom substrate packaging layer 14 that are secured together around the product P to provide a protective cushion around the product P. The top substrate packaging layer 12 and bottom substrate packaging layer 14 can be secured together, for example, by pressurized heated nip rollers or some other securing mechanism. The top substrate packaging layer 12 and the bottom substrate packaging layer 14 can each comprise a layer of heat and tear resistant packaging foam 20. Optionally, the top substrate packaging layer 12 and the bottom substrate packaging layer 14 can also comprise an outer packaging layer 16 shown in dashed lines. The optional outer packaging layer 16 can comprise, for example, a heavy gauge polyethylene film. For example, the outer packaging layer 16 of the polyethylene film can have a thickness of about 1 mil or greater.

The heat and tear resistant packaging foam 20 is stronger than tradition polyethylene foam used in such packages 10. For example, the packaging foam 20 can withstand the application of greater shear forces than traditionally polyethylene packaging foam. Additionally, packaging foam 20 can also withstand exposure to a heat that is above the melting point of polyethylene without breaking down or melting.

Figure 2:
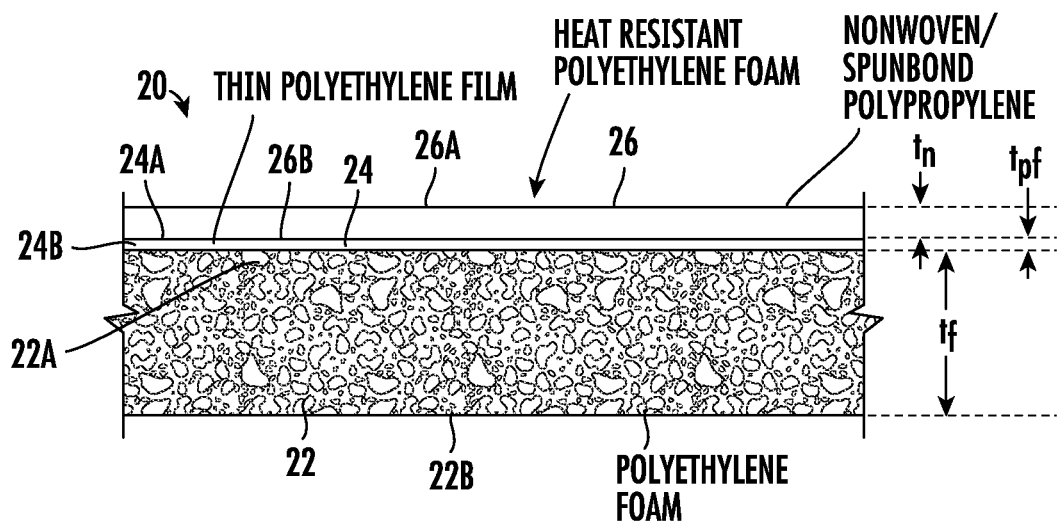
FIG. 2 illustrates a schematic cross-sectional side view of an embodiment of layers that can comprise a tear and heat resistant packaging foam according to the subject matter disclosed herein.

As shown in FIG. 2, an embodiment of a heat and tear resistant packaging foam 20 in a formation stage is provided that can comprise layers of different materials. For example, in the embodiments, the heat and tear resistant packaging foam 20 can comprise a base layer of a polyethylene foam 22 that can have a top, or first, surface 22A and a bottom, or second surface 22B. A layer of thin polyethylene film 24 having a top, or first, surface 24A and a bottom, or second surface 24B can be positioned on the first surface 22B of the layer of polyethylene foam 22. A layer of a nonwoven substrate 26 having a top, or first, surface 26A and a bottom, or second surface 26B can be positioned on the first surface 24B of the polyethylene film 24.

The polyethylene foam 22 can be formed in a traditional foam making process. The polyethylene foam 22 can have a thickness $t_f$ of between about 1/32 of inch and about 1/2 of an inch. For example, the thickness $t_f$ of the polyethylene foam 22 can be about 3/32 of an inch, which is a common thickness of foam used in protective bags used in packaging furniture. The thin polyethylene film 24 can have a thickness $t_{pf}$ of between about 1/4 mil and about 1 mil. For example, the thickness $t_{pf}$ of the thin polyethylene film 24 can be about 1/2 mil. The nonwoven substrate 26 can comprise a spunbond polypropylene nonwoven. The spunbond polypropylene nonwoven can be a thin, lightweight fabric. For example, the spunbond polypropylene nonwoven 26 can have a fabric weight of between about 6 grams/sq. meter (gsm) and about 35 gsm. For example, in some embodiments, the weight of the spunbond polypropylene nonwoven 26 can be about 8 gsm.

Figure 3:
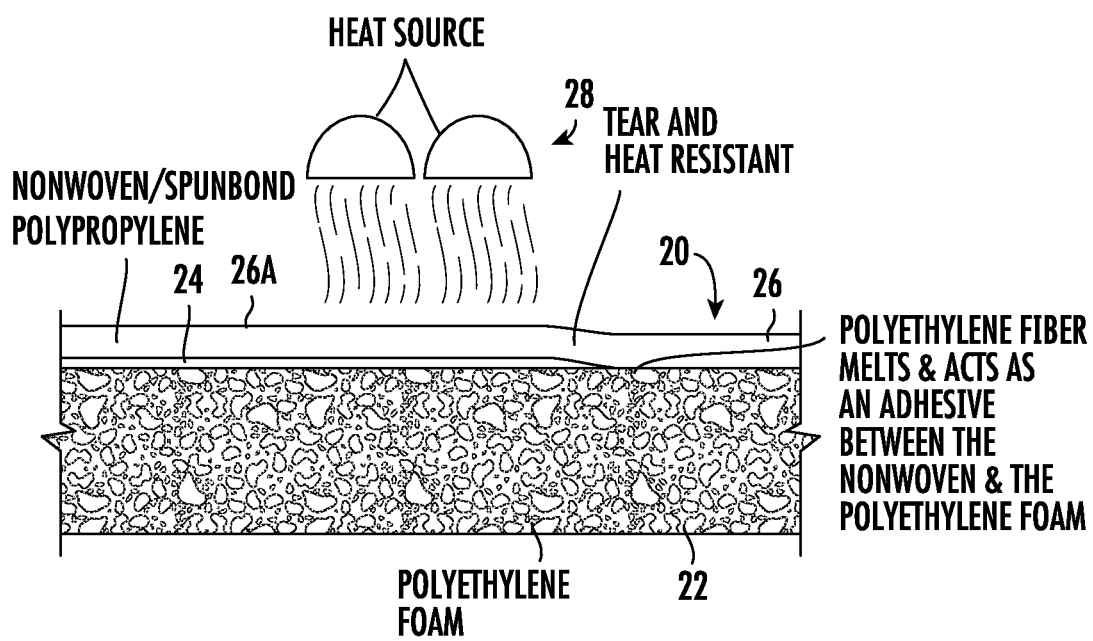
FIG. 3 illustrates a schematic cross-sectional side view of the embodiment of layers according to FIG. 2 as these layers are rendered into a tear and heat resistant packaging foam according to the subject matter disclosed herein.

By applying an appropriate amount of heat or heat and pressure to the top nonwoven substrate layer 26, the thin polyethylene film 24 and the polyethylene foam 22 can create the heat and tear resistant packaging foam 20. For example, as shown in FIG. 3, a heat source 28 can be provided proximate to the top nonwoven substrate layer 26, such as a spunbond polypropylene nonwoven, that can create a temperature at the first surface of the top nonwoven substrate 26 that is above the melting point of polyethylene but below the melting point of top nonwoven substrate 26. For example, in some embodiments in which the polyethylene of the film is low-density polyethylene, the first surface 26A of the top nonwoven substrate 26 can be heated to between about 110° C. (230° F.) and about 160° C. (320° F.). The heat generated by the heat source 28 transfers through the light weight fabric of the top nonwoven substrate 26 and raises the temperature of the thin polyethylene film 24 causing it to melt and bind the top nonwoven substrate 26 to the polyethylene foam 22 to form the heat and tear resistant packaging foam 20. The top nonwoven substrate 26, the thin polyethylene film 24 and the polyethylene foam 22 can be exposed to the heat source 28 for a sufficient amount of time to melt the thin polyethylene film 24 with limited affect to the polyethylene foam 22. Thereby, heat source 28 can provide a proper temperature and/or pressure that can melt the thin polyethylene film 24 without substantially deteriorating the polyethylene foam 22. The heat source 28 can be for example, radiant heaters, such as heat lamps, or heated nip rollers that can have the roller that runs against the top surface 26A of the top nonwoven layer 26.

The heat and tear resistant packaging foam 20 is stronger than the polyethylene foam 22 and can withstand greater shear forces and puncture forces so as to resist tears. Additionally, the heat and tear resistant packaging foam 20 is protected from the heat used in forming packages of the package materials made from the heat and tear resistant packaging foam 20, for example, the heat from shrink wrapping the packaging material or sealing the packages formed by the packaging materials.

Figure 4:
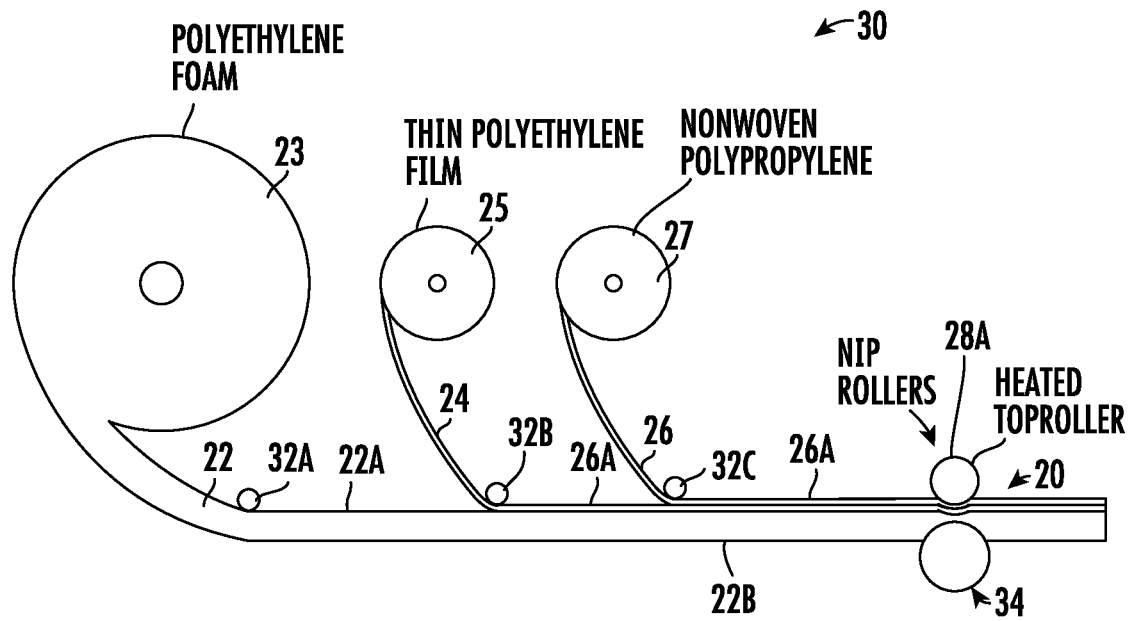
FIG. 4 illustrates a schematic side view of an embodiment of a process of forming a tear and heat resistant packaging foam according to the subject matter disclosed herein.
Figure 5:
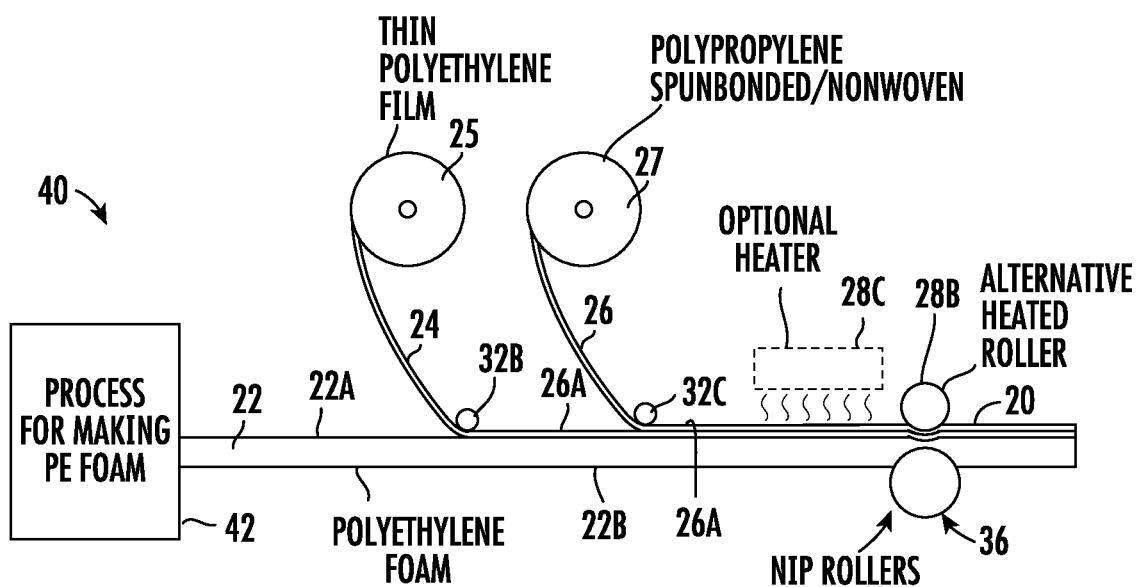
FIG. 5 illustrates a schematic side view of at least a portion of another embodiment of a process of forming a tear and heat resistant packaging foam according to the subject matter disclosed herein.

The heat and tear resistant packaging foam 20 can be formed in different ways. FIGS. 4 and 5 illustrate possible ways of forming the heat and tear resistant packaging foam 20. Referring to FIG. 4, a process, generally designated 30 is provided to form a heat and tear resistant packaging foam 20. The polyethylene foam 22 can be preformed and provided on a roll 23 of the polyethylene foam 22 that can be position to feed polyethylene foam 22 under a tension roll 32A to provide the base substrate for the heat and tear resistant packaging foam 20. A roll 25 is positioned to feed the polyethylene film 24 under a tension roll 32e on to the top surface 22A of the polyethylene foam 22. Similarly, a roll 27 of the top nonwoven substrate 26 can be positioned to feed top nonwoven substrate 26 under a tension roll 32c on to the top surface 24A of the polyethylene film 24. The three layers of the top nonwoven layer 26, the polyethylene film 24 and the polyethylene foam 22 are then fed through a set of nip rollers 34 with the top roller being a heater roller 28A with the top heater roller 28A heating the top two layers by pressing against the top surface 26A of the top nonwoven substrate 26 and the nip rollers 34 compressing the layers by pressing against the top surface 26A of the top nonwoven substrate 26 and the bottom surface 22A of the polyethylene foam 22. The heater roller 28A provides enough heat and the nip rollers 34 provide enough pressure at the source of the heat to melt the thin polyethylene film 24 with limited affect to the polyethylene foam 22 adhering the polypropylene top substrate 26 to the polyethylene foam 22 forming the heat and tear resistant packaging foam 20.

Referring to FIG. 5, another embodiment of a process 40 of forming heat and tear resistant packaging foam 20 is provided. A process line 42 for making polyethylene foam 22 can be provided in a traditional manner of feeding air into a film substrate being formed to create the polyethylene foam 22. The polyethylene foam 22 is fed as it is cooled to a position where a roll 25 provides thin polyethylene film 24. The roll 25 can be positioned to feed the thin polyethylene film 24 under a tension roll 32e on to the top surface 22A of the polyethylene foam 22. Similarly, a roll 27 of the top nonwoven layer 26 can be positioned to feed the top nonwoven layer 26 under a tension roll 32c on to the top surface 24A of the thin polyethylene film 24. The three layers of the top nonwoven layer 26, the thin polyethylene film 24 and the polyethylene foam 22 can then be fed under an optional heater 28C, such as a radiant heater, positioned above the top surface 26A of the top nonwoven layer 26 that can heat the top nonwoven layer 26 as well as the thin polyethylene film 24 can then pass through a set of nip rollers 36.

The top roller 28B of the nip rollers 36 may or may not be a heater roller. For example, in some embodiments, the top roller 28B of the nip rollers 36 may be a heater roller if the optional heater 28C is not present in the process 40. In some embodiments, the top roller 28B of the nip rollers 36 may not be a heater roller if the optional heater 28C is present in the process 40. In some embodiments, the top roller 28B of the nip rollers 36 may be a heater roller if the optional heater 28C is present in the process 40 with both the optional heater 28C and the providing heat to the layers of the top nonwoven layer 26, the thin polyethylene film 24 and the polyethylene foam 22, particularly, the top nonwoven layer 26.

The top roller 28B of the nip rollers 36 can compress the layers by pressing against the top surface 26A of the top nonwoven layer 26. The bottom nip roller can help compress the layers by pressing against the bottom surface 22A of the polyethylene foam 22. The optional heater 28C and/or the top roller 28B, if it comprises a heater roller, can provide enough heat and the nip rollers 36 can provide enough pressure proximate to the source of the heat to melt the thin polyethylene film 24 with limited affect to the polyethylene foam 22 adhering the polypropylene top layer 26 to the polyethylene foam 22 forming the heat and tear resistant packaging foam 20.

Figure 8:
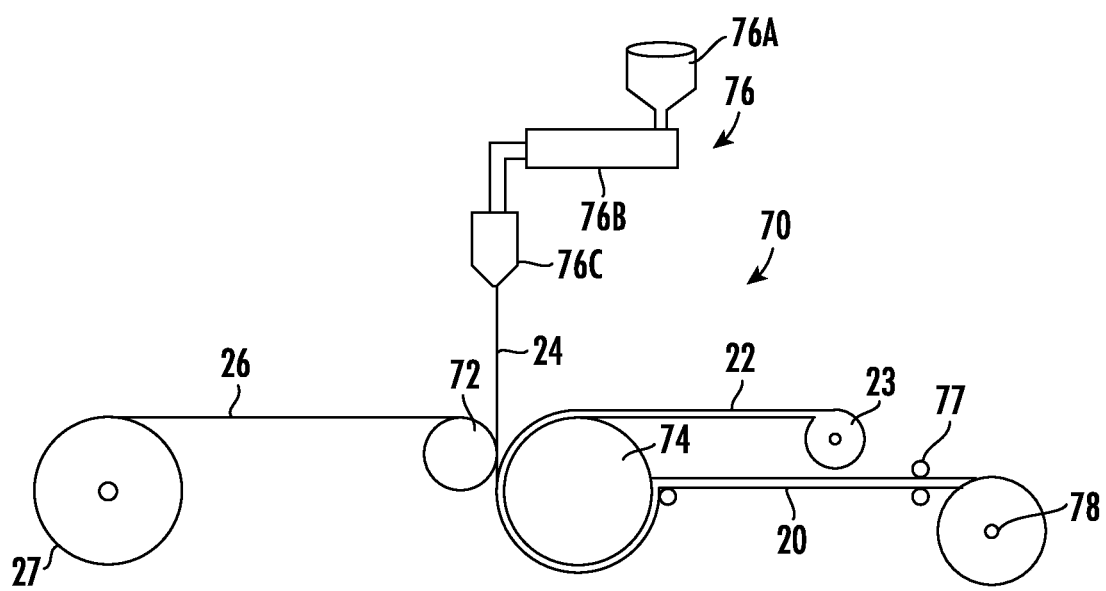
FIG. 8 illustrates a schematic side view of at least a portion of a further embodiment of a process of forming a tear and heat resistant packaging foam according to the subject matter disclosed herein.

FIG. 8 illustrates another embodiment of a process, or method, of forming a heat and tear resistant packaging foam. Referring to FIG. 8, a process, generally designated 70 is provided to form a heat and tear resistant packaging foam 20 comprising a top nonwoven substrate 26, a polyethylene film 24 and a polyethylene foam 22. In some embodiments, as shown, the polyethylene foam 22 can be preformed and provided on a roll 23 of the polyethylene foam 22. Alternatively, in some embodiments, the polyethylene foam 22 can be supplied from a process line for making polyethylene foam 22 as shown in FIG. 5. Additionally, the top nonwoven substrate 26 can be provided on a roll 27. The roll 23 of the polyethylene foam 22 can be positioned to feed polyethylene foam 22 over a drum 74 and the roll 27 of the top nonwoven substrate 26 can be positioned to feed top nonwoven substrate 26 over a heated roller, or drum, 72 such that both the polyethylene foam 22 and the top nonwoven substrate 26 pass between a nip of the drum 74 and a heater roller 72.

A polyethylene film 24 can be provided between the polyethylene foam 22 and the top nonwoven substrate 26. In particular, the polyethylene film 24 can be a film that is extruded from an extruder 76 aligned with the nip between the drum 74 and the heater roller 72 such that the polyethylene film 24 is positioned between the polyethylene foam 22 and the top nonwoven substrate 26. For example, the extruder 76 can comprise a hopper 76A, an extruder core 76B which houses a heated extruder screw for melting and mixing polyethylene feed through the hopper 76A, and an extruder die 76C through the film is extruded at the desired thickness. The hopper 76A can be configured for receiving polyethylene in a pellet, or other piece form. Alternatively, in some embodiments, the polyethylene can be feed from a polyethylene processing line in molten form to an extruder die 76C through the film is extruded at the desired thickness. After the polyethylene film 24 is extruded, the polyethylene film 24 cools as it approaches the nip between the drum 74 and the heater roller 72. For example, the distance between the extruder die 76C and the nip of the drum 74 and the heater roller 72 can be such that the polyethylene film 24 has cooled enough to have an integrity to be pulled by the rotation of the drum 74 and the heater roller 72, but still retaining enough heat to be tacky that its surfaces.

The three layers of the top nonwoven layer 26, the polyethylene film 24 and the polyethylene foam 22 are then fed through nip between the drum 74 and the heater roller 72 under pressure such that heat is transferred to the top surface of the top nonwoven substrate 26 and polyethylene film 24 so as to ensure that the polyethylene film 24 is melted with limited affect to the polyethylene foam 22 adhering the polypropylene top substrate 26 to the polyethylene foam 22 forming the heat and tear resistant packaging foam 20. In the embodiment shown, the newly formed heat and tear resistant packaging foam 20 can pass around the bottom of the drum 74 and through nip rollers 77 that can compress the heat and tear resistant packaging foam 20 top nonwoven substrate 26 polyethylene foam 22 before being rolled on a roll 78 for transport.

The heat and tear resistant packaging foam 20 provides a polyethylene based foam that can withstand exposure to temperatures above the melting point of polyethylene for short exposures such as from a shrink wrap gun or during heat exposure in a package sealing process. Additionally, the tear strength, such as when a shear force is applied to the heat and tear resistant packaging foam 20 is greater than the tear strength of a conventional polyethylene foam. Thus, the heat and tear resistant packaging foam 20 provides an improved foam for use within packaging.

Thus, methods of forming a tear and heat resistant packaging foam are provided. In some embodiments, the method or process can comprise providing base layer of polyethylene foam with a first surface and a second surface and positioning a film having a first surface and a second surface on the polyethylene foam such that the second surface of the film resides on the first surface of the polyethylene foam. The method can also comprise positioning a nonwoven substrate having a first surface and a second surface. The nonwoven substrate can be positioned on the film such that the second surface of the nonwoven substrate resides on the first surface of the film. Further, the nonwoven substrate comprising a material having a melting point above the melting point of the film. The method can also comprise applying at least one of heat or heat and pressure to the top nonwoven substrate, the film, and the polyethylene foam to heat the first surface of the top nonwoven substrate to a temperature that is above the melting point of the film but below the melting point of top nonwoven substrate. Further, the method can comprise melting the film to bind the top nonwoven substrate to the polyethylene foam to form the heat and tear resistant packaging foam.

The heat and tear resistant packaging foam 20 can be used as packaging material in a variety of uses including, but not limited to making packages similar to the package 10 shown in FIGS. 1A and 1B. Similarly, the heat and tear resistant packaging foam 20 can be used in protective bags that can be that can be subjected to shrink wrapping procedures that secure such protective bags around an item or product being packaged. Some such protective bags are disclosed in U.S. Pat. Nos. 6,006,905 and 6,189,692, both patents of which are incorporated herein in their entireties.

Figure 6:
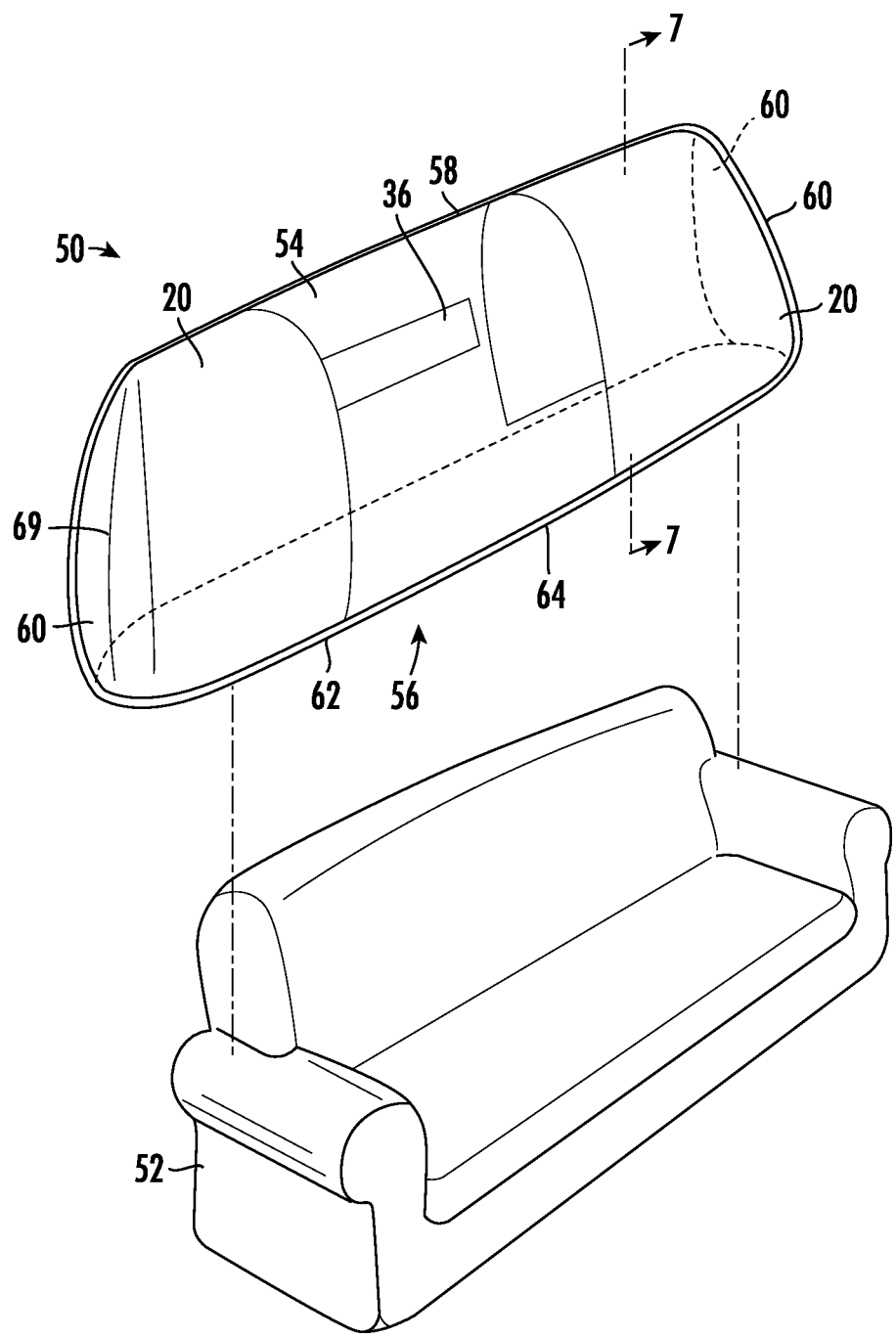
FIG. 6 illustrates a perspective view depicting a furniture article being placed into an embodiment of protective shipment and storage bag that includes an embodiment of a tear and heat resistant packaging foam according to the subject matter disclosed herein.

Referring to FIG. 6, an embodiment of protective shipment and storage bag is shown generally at 50 adapted for use with furniture articles, e.g. an upholstered sofa 52. Such protective bags in accordance with the present subject matter may also be embodied as appropriate for use with any other article of equipment, such as household appliances or the like. The description and illustration herein of an embodiment 50 for furniture articles is accordingly merely illustrative of the present subject matter and does not limit the scope or substance of the present invention.

In FIG. 6, the protective bag 50 is shown in an opened condition for receiving a furniture article, e.g., the upholstered sofa 52. The furniture bag 50 is basically configured as an elongate envelope 54 defining an interior containment area 56 sized sufficiently greater than the sofa (or other furniture article) 52 to fully enclose the furniture article within the interior area 56. As depicted, the furniture bag envelope 54 will in most cases be of a rectangular configuration (although other configurations are contemplated to be possible if and as appropriate), closed along one longitudinally extending side 58 and perpendicularly along both opposite ends 60 while being opened along the opposite longitudinally extending side 62 to define an entrance 64 into the interior containment area 56.

Figure 7:
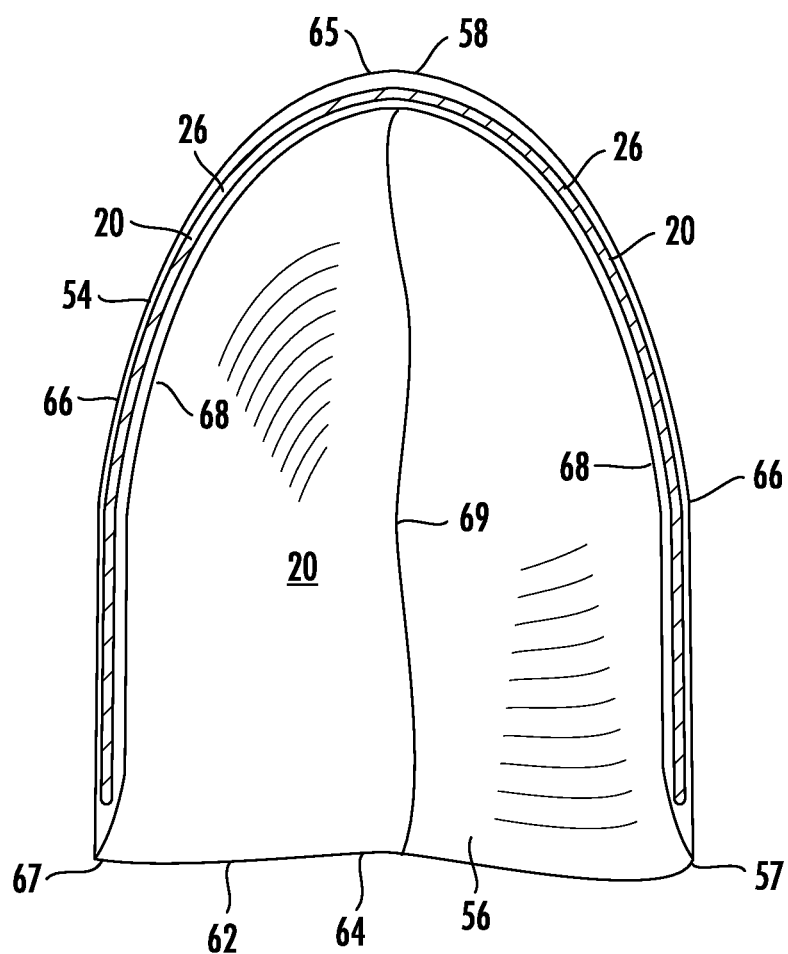
FIG. 7 illustrates a vertical cross-sectional view of the protection furniture bag of FIG. 6, taken along line 2-2 thereof.

With reference additionally to FIG. 7, the furniture bag 50 is preferably fabricated of substantially coextensive outer and inner layers 66, 68 of a transparent thermoplastic film material, preferably a heat shrinkable material such as polyethylene, folded longitudinally at 65 to form the closed lengthwise side 58 and heat sealed together at 69 along the folded end edges to form the closed ends 60. As additionally shown in FIG. 7, the coterminous lengthwise edges of the outer and inner film layers, 66, 68 are also sealed together at 67 to define opposite side edges of the entrance opening 64. The heat and tear resistant packaging foam 20 can be provided along the lengths on both sides of the bag 50 or can be provide just in the end sections of the bag 50. The heat and tear resistant packaging foam 20 provides resilient compressible cushioning foam that is sandwiched between the outer and inner film layers 66, 68. The heat and tear resistant packaging foam 20 can be sealably attached to the film layers 66, 68 along the end seals 69, respectively, but otherwise being unattached to the film layers. Further, the heat and tear resistant packaging foam 20 can be positioned between the outer and inner film layers 66, 68 such that the top nonwoven layer 26, which can be a spunbond polypropylene nonwoven, faces outward toward the outer film layers 66.

As will thus be understood, once the bag 50 is placed about the furniture article 52 to completely envelope the article 52 within the interior containment area 56, the bag can be subjected to a conventional heat shrinkage procedure to cause the outer and inner film layers 66, 68 to shrink into substantially close conformity to the dimensions and configuration of the furniture article 52, thereby also securing the protective bag 50 in place. Because the heat and tear resistant packaging foam 20 can be substantially unattached to the outer and inner film layers 66, 68 except along the end seals 69, the outer film layers 66 shrink freely and unimpeded by the heat and tear resistant packaging foam 20. Additionally, with the top nonwoven layer 26, such as a spunbond polypropylene nonwoven 26, facing the outer film layers 66 that is most exposed to the heat of the shrink wrapping procedure, the top nonwoven layer 26 aids in protecting the polyethylene foam 22 (See FIGS. 3-5) of the heat and tear resistant packaging foam 20 from damage and excessive melting of the polyethylene foam 22 preserving the heat and tear resistant packaging foam 20 for its intended purpose. While the heat provided in the shrink-wrapping procedure is hot enough to change the polyethylene outer film layers 66 and shrink its coverage surface, the heat expose is not hot enough and long enough to adversely affect the heat and tear resistant packaging foam 20. Additionally, the top nonwoven layer 26 reduces or prevents the sticking of the outer film layers 66 that has been heated through the shrink-wrapping procedure to heat and tear resistant packaging foam 20.

At the completion of the heat shrinkage operation, the heat and tear resistant packaging foam 20 remain substantially in their original disposition and relationship relative to the furniture article 52, thereby to provide optimal cushioning protection to the furniture article 52. While both the outer and inner film layers 66, 68 can be heat shrinkable, it is also contemplated that the inner layer 68 may be of non-shrinkable film, particularly if the inner layer 68 is relatively thin, without impairing the functionality of the bag 50. It is also contemplated to be possible to fabricate the envelope 54 of only a single outer layer of film 68, especially if the envelope 54 need not be heat shrunk or is to be heat shrunk about the article to only a limited degree. In such embodiments, the heat and tear resistant packaging foam 20 may be affixed to the outer film layer 68 by seal lines or points as described above or in any other suitable manner.

Thus, the present disclosure provides for a protective packaging bag. In some embodiments, the protective packaging bag that is tear and heat resistant can comprise an envelope closed at one side and at opposite ends to define an interior containment area and open at an opposite side to define an entrance into the interior containment area. The envelope can comprise coextensive inner and outer film layers and a heat and tear resistant packaging foam attached to and sandwiched between the inner and outer film layers. The heat and tear resistant packaging foam can comprise a base layer of polyethylene foam with a first surface and a second surface and a film having a first surface and a second surface. The film can be positioned on the polyethylene foam such that the second surface of the film resides on the first surface of the polyethylene foam.

The heat and tear resistant packaging foam can also comprise a nonwoven substrate having a first surface and a second surface. The nonwoven substrate can be positioned on the film such that the second surface of the nonwoven substrate resides on the first surface of the film. The nonwoven substrate can comprise a material having a melting point above the melting point of the film. The nonwoven substrate, the film, and the base layer of polyethylene foam are joined together by applying at least one of heat or heat and pressure to the top nonwoven substrate, the film, and the polyethylene foam to heat the first surface of the top nonwoven substrate to a temperature that is above the melting point of film but below the melting point of top nonwoven substrate such that the temperature of the film rises causing the film to melt and bind the top nonwoven substrate to the polyethylene foam to form the heat and tear resistant packaging foam. The heat and tear resistant packaging foam is positioned between the inner and outer film layers with the nonwoven substrate layer of the heat and tear resistant packaging foam facing the outer film layer. Additionally, the heat and tear resistant packaging foam can be attached to the inner and outer film layers at selective limited locations to allow a predetermined degree of independent movement between the heat and tear resistant packaging foam and the film layers.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A tear and heat resistant packaging foam comprising: a base layer of polyethylene foam with a first surface and a second surface; a film having a first surface and a second surface, the film being positioned on the polyethylene foam such that the second surface of the film resides on the first surface of the polyethylene foam;
a nonwoven substrate having a first surface and a second surface, the nonwoven substrate being positioned on the film such that the second surface of the nonwoven substrate resides on the first surface of the film, the nonwoven substrate comprising a material having a melting point above the melting point of the film; and
the nonwoven substrate, the film, and the base layer of polyethylene foam joined together by applying at least one of heat or heat and pressure to the top nonwoven substrate, the film and the polyethylene foam to heat the first surface of the top nonwoven substrate to a temperature that is above the melting point of the film but below the melting point of the top nonwoven substrate such that the temperature of the film rises causing the film to melt, such that the top nonwoven substrate is bound to the polyethylene foam by the melted film to form the heat and tear resistant packaging foam.

2. The heat and tear resistant packaging foam according to claim 1, wherein the polyethylene foam has a thickness of between about ¹⁄₃₂ of inch and about ½ of an inch.

3. The heat and tear resistant packaging foam according to claim 1, wherein the film comprises a polyethylene film has a thickness of between about ¼ mil and about 1 mil.

4. The heat and tear resistant packaging foam according to claim 1, wherein the nonwoven substrate comprises a spunbond polypropylene nonwoven.

5. The heat and tear resistant packaging foam according to claim 1, wherein the nonwoven substrate comprises a spunbond polypropylene nonwoven having a fabric weight of between about 6 grams/sq. meter (gsm) and about 35 gsm.

6. The heat and tear resistant packaging foam according to claim 1, wherein the film comprises low-density polyethylene.

7. A protective packaging bag that is tear and heat resistant, the protective packaging bag comprising:
an envelope closed at one side and at opposite ends to define an interior containment area and open at an opposite side to define an entrance into the interior containment area, the envelope comprising:
coextensive inner and outer film layers and a heat and tear resistant packaging foam attached to and sandwiched between the inner and outer film layers, the heat and tear resistant packaging foam comprising:
a base layer of polyethylene foam with a first surface and a second surface; a film having a first surface and a second surface, the film being positioned on the polyethylene foam such that the second surface of the film resides on the first surface of the polyethylene foam;
a nonwoven substrate having a first surface and a second surface, the nonwoven substrate being positioned on the film such that the second surface of the nonwoven substrate resides on the first surface of the film, the nonwoven substrate comprising a material having a melting point above the melting point of the film; and
the nonwoven substrate, the film, and the base layer of polyethylene foam joined together by applying at least one of heat or heat and pressure to the top nonwoven substrate, the film and the polyethylene foam to heat the first surface of the top nonwoven substrate to a temperature that is above the melting point of the film but below the melting point of the top nonwoven substrate such that the temperature of the film rises causing the film to melt, such that the top nonwoven substrate is bound to the polyethylene foam by the melted film to form the heat and tear resistant packaging foam; and
wherein the heat and tear resistant packaging foam is positioned between the inner and outer film layers with the nonwoven substrate layer of the heat and tear resistant packaging foam facing the outer film layer and the heat and tear resistant packaging foam is attached to the inner and outer film layers at selective limited locations to allow a predetermined degree of independent movement between the heat and tear resistant packaging foam and the film layers.

8. The protective packaging bag according to claim 7, wherein the polyethylene foam has a thickness of between about 1/32 of inch and about 1/2 of an inch.

9. The protective packaging bag according to claim 7, wherein the film comprises a polyethylene film has a thickness of between about 1/4 mil and about 1 mil.

10. The protective packaging bag according to claim 7, wherein the nonwoven substrate comprises a spunbond polypropylene nonwoven.

11. The protective packaging bag according to claim 7, wherein the nonwoven substrate comprises a spunbond polypropylene nonwoven having a fabric weight of between about 6 grams/sq. meter (gsm) and about 35 gsm.

12. The protective packaging bag according to claim 7, wherein the film comprises low-density polyethylene.

13. The protective packaging bag according to claim 7, the top nonwoven substrate, the film and the polyethylene foam are exposed to the heat source and a pressure source for a sufficient amount of time to melt the polyethylene film with limited affect to the polyethylene foam.

14. A method of making a heat and tear resistant packaging foam, the method comprising:
providing base layer of polyethylene foam with a first surface and a second surface;
positioning a film having a first surface and a second surface on the polyethylene foam such that the second surface of the film resides on the first surface of the polyethylene foam;
positioning a nonwoven substrate having a first surface and a second surface, the nonwoven substrate being positioned on the film such that the second surface of the nonwoven substrate resides on the first surface of the film, the nonwoven substrate comprising a material having a melting point above the melting point of the film;
applying at least one of heat or heat and pressure to the top nonwoven substrate, the film and the polyethylene foam to heat the first surface of the top nonwoven substrate to a temperature that is above the melting point of the film but below the melting point of top nonwoven substrate; and
melting the film to bind the top nonwoven substrate to the polyethylene foam to form the heat and tear resistant packaging foam.

15. The method according to claim 14, wherein the step of applying at least one of heat or heat and pressure to the top nonwoven substrate, the film and the polyethylene foam comprises passing the top nonwoven substrate, the film and the polyethylene foam through nip rollers that comprise a heated top roller.

16. The method according to claim 15, wherein the step of applying at least one of heat or heat and pressure further comprising a heat source positioned proximate to the first surface of the top nonwoven substrate.

17. The method according to claim 14, wherein the step of positioning a film comprises extruding the film such that the extruded polyethylene film aligns with both the top nonwoven substrate and the foam with the second surface of the film residing on the first surface of the polyethylene foam and the second surface of the nonwoven substrate resides on the first surface of the film.

* * * * *